(12) United States Patent
Bitzer et al.

(10) Patent No.: US 6,732,631 B1
(45) Date of Patent: May 11, 2004

(54) NEEDLE BEARING AND PUMP UNIT HAVING A NEEDLE BEARING

(75) Inventors: Harold Bitzer, Buehl (DE); Joerg Eigenmann, Karlsruhe (DE); Wilhelm Braun, Buehl (DE); Alexander Bareiss, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 10/019,014

(22) PCT Filed: Jun. 3, 2000

(86) PCT No.: PCT/DE00/01815

§ 371 (c)(1),
(2), (4) Date: Apr. 15, 2002

(87) PCT Pub. No.: WO00/79144

PCT Pub. Date: Dec. 28, 2000

(30) Foreign Application Priority Data

Jun. 22, 1999 (DE) .......................... 199 28 480

(51) Int. Cl.[7] .............. F01B 1/00; F01B 9/00; F16C 19/49; F16C 33/58; F04B 17/00
(52) U.S. Cl. .................. 92/72; 92/140; 417/415; 417/273; 384/494; 384/564
(58) Field of Search .................. 417/415, 273; 92/72, 140; 384/494, 564

(56) References Cited

U.S. PATENT DOCUMENTS 2,271,570 A * 2/1942 Pardee .................. 417/273
2,472,355 A * 6/1949 Whittingham .......... 417/273
5,230,275 A * 7/1993 Hodge et al. ............ 92/68
5,668,422 A * 9/1997 Deynet ................... 310/71
5,801,467 A * 9/1998 Volz et al. ............... 310/89
5,865,090 A * 2/1999 Volz et al. ............... 92/129
6,272,970 B1 * 8/2001 Schaefer ................. 92/72

FOREIGN PATENT DOCUMENTS

| DE | 196 33 170 A1 | * | 2/1998 | .......... H02K/5/124 |
| DE | 19636508 A1 | * | 3/1998 | .......... F04B/1/04 |
| DE | 197 20 615 C1 | * | 6/1998 | .......... H02K/7/14 |
| DE | 197 06 124 A1 | * | 8/1998 | .......... H02K/5/16 |
| DE | 19827653 A1 | * | 12/1999 | .......... F04B/1/04 |
| DE | 19830890 A1 | * | 1/2000 | .......... H02K/7/14 |
| DE | 19839430 A1 | * | 3/2000 | .......... F04B/1/04 |
| DE | 19840048 A1 | * | 3/2000 | .......... F04B/17/04 |
| EP | 0 539 849 A1 | * | 5/1993 | .......... F04C/29/00 |

* cited by examiner

*Primary Examiner*—Justine R. Yu
*Assistant Examiner*—Timothy P. Solak
(74) *Attorney, Agent, or Firm*—Ronald E. Greigg

(57) ABSTRACT

A needle bearing for use in a pump has an inner race, embodied as an eccentric sleeve, needles, and an outer race with rims oriented radially inward on both of its face ends, of which one rim is intended to secure the axial position of the needles and the outer race by engagement with the inner race, in that a rim fits over one end face of the inner race. In the pump unit, the needle bearing is disposed with an axial gap from a roller bearing on a shaft of a drive motor. The rim of the outer race engages this gap.

2 Claims, 1 Drawing Sheet

NEEDLE BEARING AND PUMP UNIT HAVING A NEEDLE BEARING

CROSS-REFERENCE TO RELATED APPLICATIONS

This application is a 35 USC 371 application of PCT/DE 00/01815 filed on Jun. 3, 2000.

BACKGROUND OF THE INVENTION

1. Field of the Invention

The invention is based on a pump unit with a needle bearing particularly useful as a pump for traction controlled hydraulic vehicle brake systems.

2. Description of the Prior Art

A pump unit with a needle bearing of this generic type is already known (German Patent 197 20 615 C1). The pump unit has an electric drive motor, whose shaft engages an eccentrically embodied sleeve of a component in such a way as to transmit torque. The sleeve is supported with a respective roller bearing, toward the motor and remote from the motor, in a pump block onto which the motor is also mounted. Immediately adjacent the roller bearing toward the motor, the sleeve carries a needle bearing. The sleeve acts as an inner race of the needle bearing, whose needles received in a cage carry a needle bush as an outer race. The outer race is engaged by pump pistons, which are received radially to the axis of the motor shaft in the pump block.

Needle bearings with an inner race are not self-locking. The outer race of the known needle bearing is therefore provided, on both of its two face ends, with a respective radially inward-oriented rim, and these rims fit over the needles on the face end. To assure the axial position of the needles and outer race on the inner race, one rim of the outer race is intended for engagement, with play, of the end face of the inner race of the roller bearing toward the motor. Conversely, on the side of the roller bearing remote from the motor, a collar formed onto the eccentric sleeve is embodied for the other rim of the outer race to run up against. However, because of this design there are disadvantages: Because of the collar, the two roller bearings are relatively widely spaced apart, and the collar requires expensive machining or deformation of the component that has the sleeve. Since the rim of the needle bush toward the motor is embodied as completely flat on the face end, there is furthermore the risk that it will cause damage, in wear-caused contact with a bearing cover disk of the roller bearing toward the motor.

From German Patent Disclosure DE 44 33 972 A1, in a pump unit, it is known to embody one end portion of a motor shaft as an eccentric element, on which the needles of a needle bearing roll directly. The outer race, which is engaged by a pump piston of a radial piston pump, has one rim, fitting over the needles, on each of the two face ends. The outer race is braced on the inner race of an immediately adjacent roller bearing on the motor shaft by one rim; the other rim is assigned a stop face on a shoulder of a bore in a pump block, in order to support the needle bearing axially. In this embodiment, it is disadvantageous that the stop face has to be treated to reduce wear, which is complicated.

Furthermore, from European Patent Disclosure EP 0 637 690 A1, in a pump unit with a radial piston pump, it is also known to press an eccentric sleeve onto a motor shaft, which in turn imposes a press fit on a roller bearing embodied as a radial deep groove ball bearing, whose outer race is engaged by a pump piston. Since such a roller bearing is self-locking, no provisions are needed to secure the axial position of its outer race.

SUMMARY OF THE INVENTION

The pump unit of the invention is advantageous in terms of the fact that with little effort or expense, self-locking of the needle bearing on the shaft of the drive motor is attained by providing that the outer race is guided by form locking of its rim, between the two inner races, secured to the shaft with force locking, of the needle bearing and the roller bearing. No other guide element or stop face for the outer race is needed, which has not only cost advantages but leads to an axial shortening of the entire arrangement, which in turn then makes a compact, economical design of the pump block possible. Moreover, because of the design of the inner race of the needle bearing as an eccentric element, the manufacture of the motor shaft becomes less expensive, and high bending strength of the shaft is obtained.

In one embodiment of the invention, a specific relation exists in terms of the area between the rim of the outer race of the needle bearing and the inner race of the roller bearing. The offset bend or protuberance prevents the rim from running up against a bearing cover disk of the roller bearing as well as preventing wear to it. The offset bend or protuberance makes a volume of material available that can decrease over the service life of the pump unit as a result of wear. This prevents damage to the needle bearing or roller bearing. Moreover, because of the design of the inner race of the needle bearing as an eccentric element, the manufacture of the motor shaft becomes less expensive, and high bending strength of the shaft is obtained.

By the provision recited in claim 3, a contact defined in terms of area between the rim of the outer race of the needle bearing and the inner race of the roller bearing is specified. The offset bend or protuberance prevents the rim from running up against a bearing cover disk of the roller bearing as well as preventing wear to it. The offset bend or protuberance makes a volume of material available that can decrease over the service life of the pump unit as a result of wear. This prevents damage to the needle bearing or roller bearing.

BRIEF DESCRIPTION OF THE DRAWINGS

One exemplary embodiment of the invention is described herein below with specific reference to the drawings, in which.

DESCRIPTION OF THE PREFERRED EMBODIMENT

Figure 1:
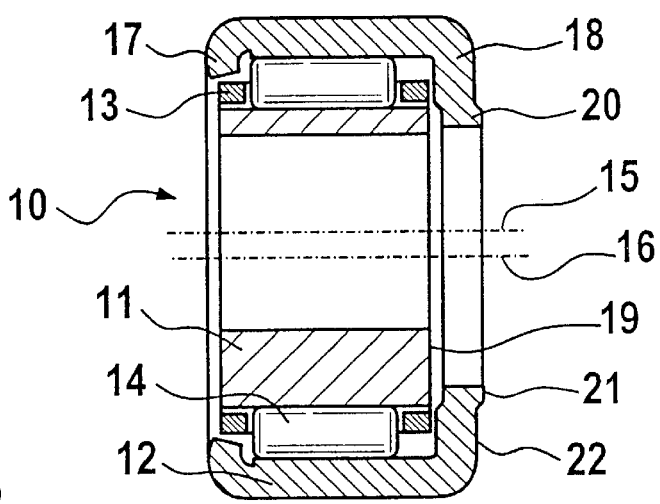
FIG. 1 shows a needle bearing in section.

A needle bearing shown in section in FIG. 1 of the drawing has an inner race 11, an outer race 12, and needles 14, received between the inner race and the outer race and guided in a cage 13. The inner race 11 is embodied as an eccentric sleeve with an axis 15. The outer race 12 has an axis 16 and is designed in the form of a needle bush. The outer race 12 is provided with radially inward-oriented rims 17 and 18, one on each of its two face ends. The rim 17 has a slight radial width and projects inwardly over only the needles 14. The rim 18 conversely has a greater radial width and extends inwardly over one end face 19 of the inner race 11. The rim 18 attains nearly the inside diameter of the inner race 11, where the inner race has its least wall thickness. On its inner edge, the rim 18 has an axial offset bend or protuberance 20, oriented away from the end face 19 of the inner race 11. The offset bend or protuberance 20 forms a bead of material extending concentrically to the axis 16 of the outer race; this bead protrudes beyond an end face 22 of the rim 18, remote from the inner race 11, and ends in an end face 21, which extends parallel to the end face 22. Because of the fit of the rim 18 over the inner race 11, a lock of the outer race 12, cage 13 and needles 14 on the inner race 11 in one axial direction is achieved.

Figure 2:
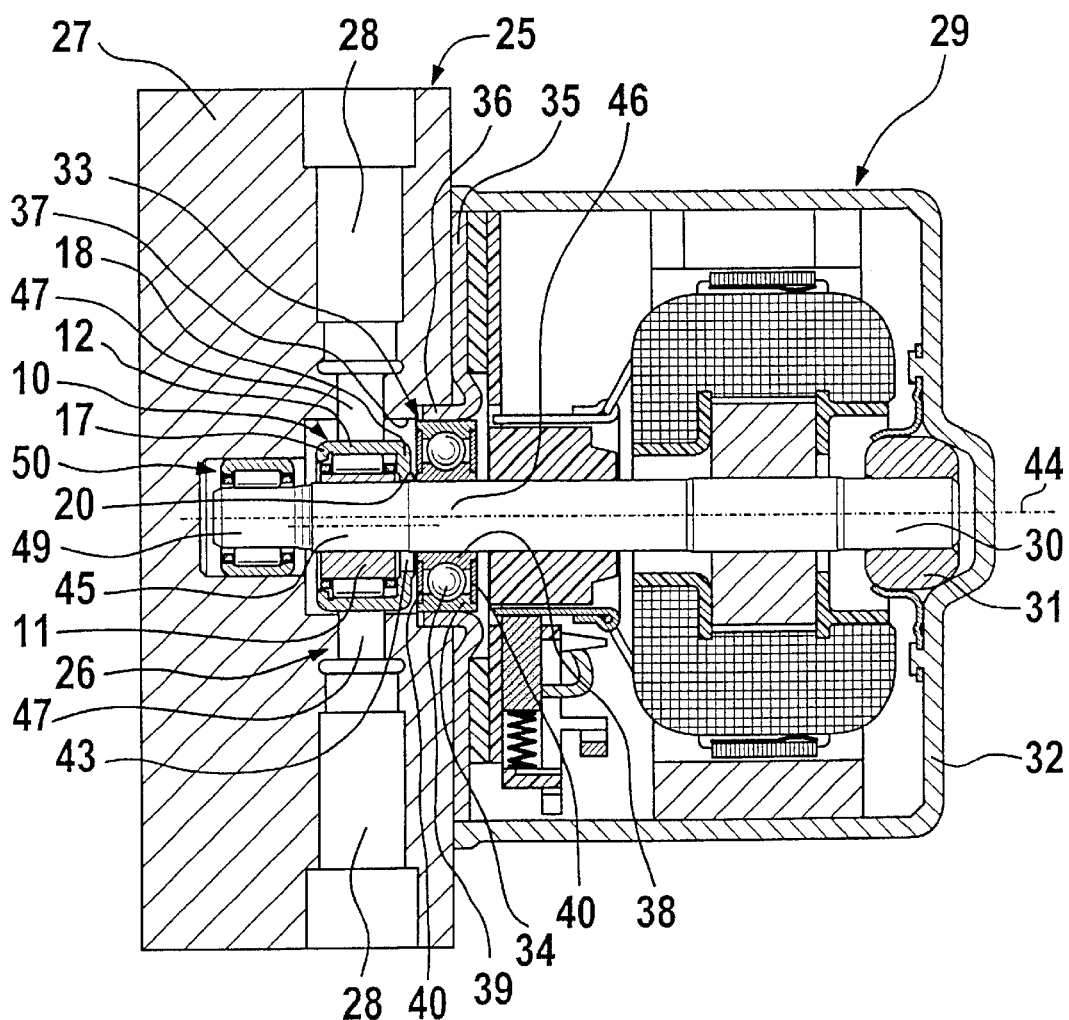
FIG. 2 shows a longitudinal section through a pump unit with a needle bearing of FIG. 1.

A pump unit 25, shown in longitudinal section in FIG. 2 of the drawing, is intended for use in traction-controlled hydraulic vehicle brake systems. The pump unit 25 has a radial piston pump 26, with two pump elements 28 disposed in a pump block 27. An electric drive motor 29 of the radial piston pump 26 is mounted on the pump block 27. The drive motor 29 has a shaft 30, which is supported by its end remote from the pump block in a slide bearing 31. The slide bearing 31, braced in a housing 32 of the drive motor 29, forms a loose bearing for the shaft 30. Toward the pump block, the shaft 30 is supported in a roller bearing 33, in the form of a radial deep groove ball bearing. An outer race 34 of the roller bearing 33 is seated with a press fit in a housing cap or flange 35 of the housing 32. A collar 36, surrounding the outer race 34 of the roller bearing 33 on its circumference, of the housing cap 35 engages a stepped bore 37 of the pump block 27. An inner race 38 of the roller bearing 33 is held by a press fit on the shaft 30 of the drive motor 29. The balls 39 are covered, on both face ends of the roller bearing 33, by bearing cover disks 40. The roller bearing 33 is a fixed bearing of the shaft 30.

The needle bearing 10 described in conjunction with FIG. 1 is disposed immediately adjacent the roller bearing 33 on the shaft 30 of the drive motor 29. The inner race 11 of the needle bearing 10 is press-fitted onto the shaft 30 of the drive motor 29, leaving a gap 43 between the inner race 11 and the roller bearing 33. The axis 15 of the needle bearing 10 coincides with the axis 44 of the shaft 30. The diameter of the shaft portion 45 that receives the needle bearing 10 is only slightly reduced, compared to the portion 46 of the shaft 30 that extends from the roller bearing 33 to the slide bearing 31. This latter portion therefore has high bending strength. The outer race 12 of the needle bearing 10 is engaged on the jacket face, in a plane extending perpendicular to the shaft axis 44, by oscillatingly movable pump pistons 47 of the pump elements 28 of the radial piston pump 26. The needle bearing 10 is disposed on the shaft 30 in such a way that the radially wider rim 18 fits with only slight axial play into the gap 43 between the inner race 11 of the needle bearing 10 and the inner race 38 of the roller bearing 33. A lock of the outer race 12 of the needle bearing 10 in both axial directions is thus attained. The slight axial migration of the outer race 12 allowed by the play of the rim 18 in the gap 43 is limited on one side by the inner race 11 of needle bearing 10 and on the other side by the inner race 38 of the roller bearing 33. In the process, only the end face 21 of the offset bend or protuberance 20 on the rim 18 comes into contact with the inner race 38 of the roller bearing 33. The bearing cover disk 40 of the roller bearing 33 toward the needle bearing is not touched by the rim 18. Over the service life of the pump unit 25, the offset bend or protuberance 20 makes a volume of material that is subjected to wear available. The lock thus attained for the outer race 12 makes a stop face on the pump block unnecessary. Furthermore, this embodiment makes it possible to dispose the needle bearing 10 with relatively slight axial spacing from the roller bearing 33, so that the forces engendered by the pump pistons 47 and exerted on the needle bearing 10 cause only slight sagging of the shaft 30 and accordingly reduced noise of the pump unit 25.

The shaft 30 of the drive motor 29 is supported on its end portion 49 toward the pump block by a further needle bearing 50 in the bore 37 of the pump block 27. This additionally reduces the sagging of the shaft 30. The needle bearing 50 forms a second loose bearing of the shaft 30.

The foregoing relates to preferred exemplary embodiments of the invention, it being understood that other variants and embodiments thereof are possible within the spirit and scope of the invention, the latter being defined by the appended claims.

What is claim:

1. A pump unit (25), in particular for traction-controlled hydraulic vehicle brake systems, comprising a radial piston pump (26) having at least one pump piston (47) in a pump block (27), a drive motor (29) mounted on the pump block (27), a shaft (30) driven by the drive motor (29) and supported by a roller bearing (33) having an inner race (38) and carrying, immediately adjacent to the inner race of the roller bearing (33), a needle bearing (10), the needle bearing having an inner race (11) embodied as an eccentric sleeve and an outer race (12) in the form of a needle bush as well as needles (14) between the inner race (11) and the outer race (12), the outer race (12) of the needle bearing being provided on each of its two face ends with radially inward-oriented rims (17, 18), of which only one rim (18), to secure the axial position of needles (14) and the outer race (12), fits over one end face (19) of the inner race (11) of the needle bearing and engages with the inner race (38) of the roller bearing (33), while the pump piston (47) of the radial piston pump (26) engages a jacket of the outer race (12) of the needle bearing (10), the inner race (11) of the needle bearing (10) and the inner race (38) of the roller bearing (33) being pressed onto the shaft (30) and the one rim (18) of the outer race (12) of the needle bearing (10) intended for engagement with the inner race (38) of the roller bearing (33) extends radially into a gap between the inner races (11, 38) of the needle bearing (10) and roller bearing (33).

2. The pump unit of claim 1, wherein the one rim (18) of the outer race (12) of the needle bearing (10), on its inner edge, has an axial offset bend or protuberance (20) oriented counter to the inner race (38) of the roller bearing (33), said protuberance having a radially extending flat end face (21) positioned to run up against the inner race (38) of the roller bearing (33).

\* \* \* \* \*